US006929841B1

(12) United States Patent
Van Dijk et al.

(10) Patent No.: US 6,929,841 B1
(45) Date of Patent: Aug. 16, 2005

(54) PLASTIC-BASED COMPOSITE PRODUCT AND METHOD AND APPARATUS FOR MANUFACTURING SAME

(75) Inventors: Dirk Van Dijk, Benenden (NL); Franciscus B. A. De Vries, Eibergen (NL)

(73) Assignee: Tech-Wood International Ltd., St. Peter Port (GB)

( * ) Notice: Subject to any disclaimer, the term of this patent is extended or adjusted under 35 U.S.C. 154(b) by 0 days.

(21) Appl. No.: 09/171,910

(22) PCT Filed: Apr. 27, 1995

(86) PCT No.: PCT/NL95/00153

§ 371 (c)(1),
(2), (4) Date: May 13, 1999

(87) PCT Pub. No.: WO96/34045

PCT Pub. Date: Oct. 31, 1996

(51) Int. Cl.⁷ .............................. C08K 7/00; B32B 27/04
(52) U.S. Cl. ...................... 428/114; 428/105; 428/106; 428/107; 428/108; 428/113
(58) Field of Search ................................ 428/114, 105, 428/106, 107, 108, 109, 112, 113; 528/502 R; 524/35, 567

(56) References Cited

U.S. PATENT DOCUMENTS

| | | | |
|---|---|---|---|
| 3,770,859 A | * 11/1973 | Bevan | 264/108 |
| 4,559,262 A | * 12/1985 | Cogswell et al. | 156/166 |
| 5,082,605 A | 1/1992 | Brooks et al. | 264/40.6 |
| 5,096,406 A | 3/1992 | Brooks et al. | 425/205 |
| 5,273,819 A | * 12/1993 | Jex | 264/172.11 |
| 5,401,154 A | 3/1995 | Sargent | 425/114 |
| 5,474,722 A | * 12/1995 | Woodhams | 264/108 |
| 5,882,564 A | * 3/1999 | Puppin | 264/177.16 |

FOREIGN PATENT DOCUMENTS

| | | |
|---|---|---|
| DE | 28 11 795 | 3/1978 |
| EP | 0 008 143 | 7/1979 |
| EP | 0 319 589 | 6/1988 |
| EP | 0 591 801 | 9/1993 |
| JP | 59217743 | 12/1984 |
| JP | 60069161 | 4/1985 |
| JP | 2098429 | 10/1990 |
| JP | 6279615 | 10/1994 |
| NL | 9302125 | 12/1993 |
| NL | 9400308 | 2/1994 |
| SU | 1100288 | 6/1984 |

OTHER PUBLICATIONS

The Dictionary of Friber and Textiles Technology, Kosa, pp. 15, 83, 96, 106, and 176.*

* cited by examiner

Primary Examiner—Sandra M. Nolan
Assistant Examiner—Alicia Chevalier
(74) Attorney, Agent, or Firm—Smith, Gambrell & Russell, LLP

(57) ABSTRACT

The invention relates to a plastic-based composite product which consists at least partially of a plastic in which a material consisting substantially of particles is homogeneously embedded, which particles have tensile strength in at least one principal direction. The invention provides a product of the stated type which has the special feature that the particles comprise: small particles, in particular plates or fibres, with a random orientation and a length of 0.2–2 mm; and large particles with a dominant orientation, for instance 80–95%, of the said principal direction of the particles in a chosen product principal direction and a length in the particle principal direction of about 2–6 mm.

23 Claims, 3 Drawing Sheets

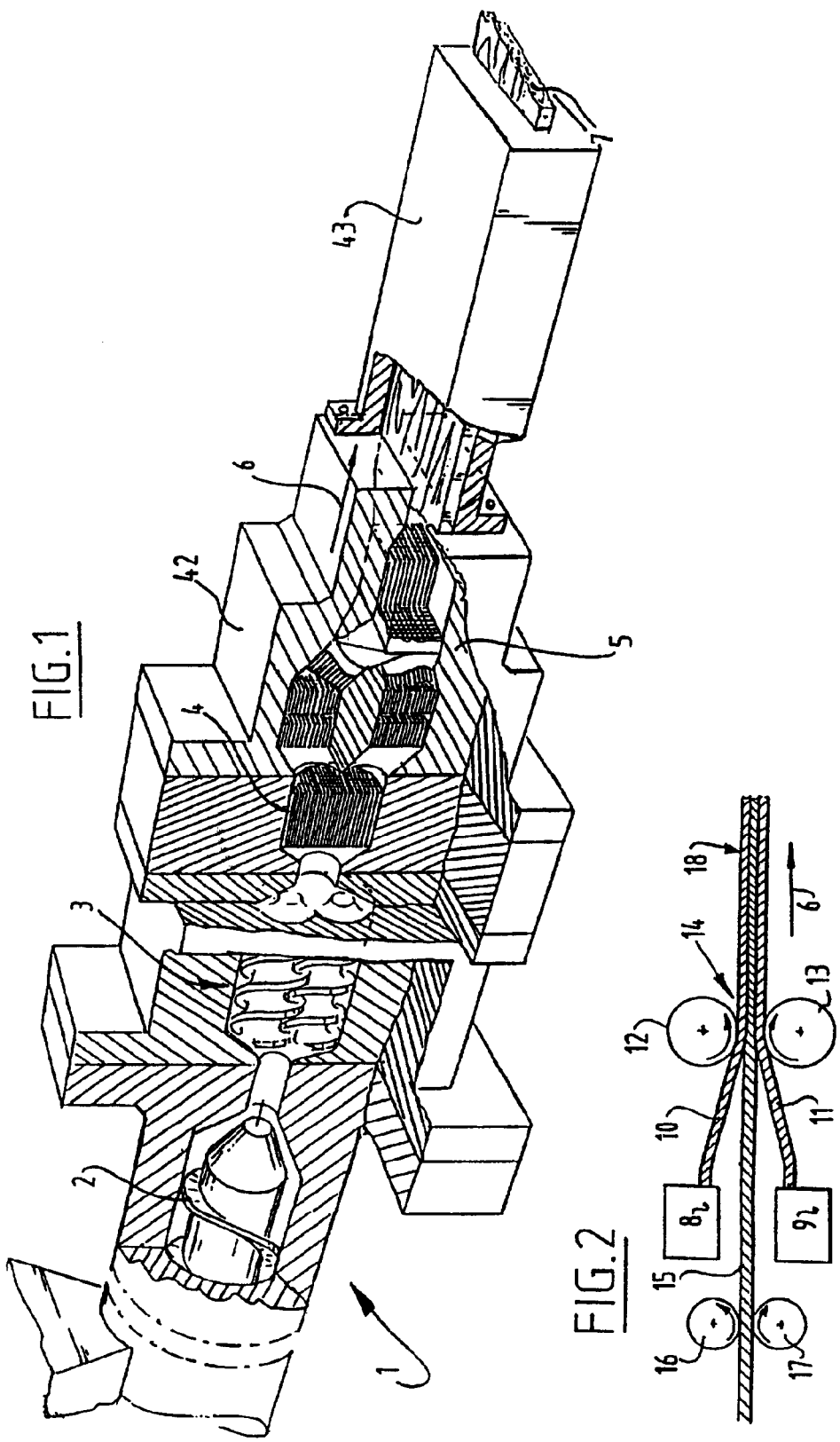

PLASTIC-BASED COMPOSITE PRODUCT AND METHOD AND APPARATUS FOR MANUFACTURING SAME

BACKGROUND OF THE INVENTION

The invention relates to a plastic-based composite product which consists at least partially of a plastic in which a material consisting substantially of particles is homogeneously embedded, which particles have tensile strength in at least one principal direction.

It is an object of the invention to provide a product which can be manufactured at low cost but which nevertheless meets high standards which may be required in respect of diverse properties. Such properties can relate for instance to mechanical properties, fire resistance, weather resistance, non-ageing properties and the like.

SUMMARY OF THE INVENTION

With a view to the above, the invention provides a product of the stated-type which has the special feature that the particles comprise:

small particles, in particular plates or fibres with a random orientation and a length of 0.2–2 mm; and large particles with a dominant orientation, for instance 80–95%, of the said principal direction of the particles in a chosen product principal direction and a length in the particle principal direction of about 2–6 mm.

A specific embodiment has the characteristic that the large particles comprise plates and the particle principal direction extends in the main plane thereof.

In order to easily obtain the desired orientation of the plates the embodiment is recommended wherein the plates have an at least more or less isotropic tensile strength in their main plane.

Very suitable in this latter context is the variant wherein the plates consist substantially of mica.

It is noted that according to the invention the particles can also possess a generally elongate form, whereby they may be designated as fibres.

A specific and very advantageous variant has the feature that the particles consist predominantly of wood material and the plastic is a thermoplastic polymer material, in particular at least one polyolefin or one polymer on a basis of styrene, wherein a. the transverse dimension of the large wood particles is preferably such that the ratio of the length in the principal direction of the particles to this transverse dimension amounts to a minimum of 4, but preferably lies in the range of 6–80.
b. the wood particles are present in a quantity of 40–80% by mass, but preferably from 50 to 70% by mass in relation to the mass of product.
c. the obtained product complies minimally with the following requirements relating to mechanical properties in
bending strength in the fibre direction: 8 MPa
bending modulus in the fibre direction: 3 GPa
tensile strength in the fibre direction: 6 MPa
tensile stress modulus in fibre direction: 3 GPa
tensile strength transversely of fibre direction: 0.3 MPa
tensile stress modulus transversely of fibre direction: 1GPa.

The invention herewith provides a product which in the manner to be described hereinbelow can be manufactured on a basis of wood without waste and, if desired, as a continuous process, which product not only possesses mechanical and physical/chemical properties corresponding with wood but which product can be manufactured on the basis of basic wood which can if desired be inferior and can be classified as interior wood, exterior wood or construction wood. This product according to the invention will hereinafter be designated as technical wood.

The invention provides the possibility of applying the obtained product at locations where tropical hardwood is still indicated.

For this purpose particles with tensile strength such as wood particles, preferably originating from waste wood or wood waste, optionally together with suitable strengthening particles, are predominantly oriented and bound by means of a thermoplastic polymer, preferably on a basis of olefins or styrene, wherein the proportion of applied particles is extreme relative to the binder polymer such that there is no question of this being a fibre-filled thermoplastic material but an exceptionally wood-like material which can be processed in a manner usual for an expert.

It is important that the method can be performed continuously and comprises the stages of compressing, compounding, fibre-orienting and shaping, wherein the following requirements must be fulfilled.

1. the compression stage wherein expulsion of included gases, both inter- and intrafibular, must likewise take place under conditions wherein the fibres remain intact.
2. the compounding phase wherein the mixing of components and wetting with polymer melt must take place under conditions wherein fibres sensitive to breakage and splitting remain intact.
3. the orienting phase wherein a dominant orientation of long particles in the compressed plastic material must take place under conditions such that the mutual position of the particles in the mix is by and large retained, that is, the orientation proceeds along fluent flow lines, gradually and without such high shear stresses that there would thereby be a danger of thermal degradation.
4. the shaping phase wherein the mix acquires its fixed shape and dimensioning on the cross section perpendicularly of the flow direction, likewise under conditions wherein the relative mutual position of the particles remains practically unchanged, for which purpose the material flows under overpressure out of the mould head and remains at pressure in the calibrating unit until the binding polymer phase has cooled to below the Vicat softening temperature.

There is no extrusion here, since in extrusion the melted mass, after leaving the extrusion head, is relatively pressureless or is at least under a relatively small overpressure such as is necessary to allow an after-flow of the plastic core of the shaped product in the calibrating unit in order to thus enable replenishing of the material deficit resulting from shrinkage. This after-flow must always be avoided because it would be accompanied by delamination and a decrease in cohesion between particles and plastic and the desired properties would consequently not be obtained.

There is also no question of pulltrusion since tensile forces are therein exerted on the shaped product after and in the final part of the consolidation phase for the purpose of continuous discharge of the shaped product, which otherwise acquires its shape in pressureless manner or under relatively small overpressure from a fusing of thermoplastic and fibre reinforcement.

The method according to the invention involves a shaping process under continuous significant overpressure, wherein the material does not flow but is pushed forward as a plastic plug through orientation, shaping and consolidation phase.

This method is therefore designated with the name of pushtrusion.

The obtained product on the basis of wood particles and plastic, technical wood, is fully recyclable due to the fibre binding by means of a thermoplastic. It will be apparent that recycled polyolefins and styrenes can also be used as fibre binder.

Additives can moreover be added during the compounding phase, whereby properties are given to the technical wood which surpass those of natural wood, particularly when fast-growers such as firs, pines, birches and poplars are used as starting point.

The method as continuous process will be designated as compushtrusion and the apparatus in which the method is performed will be designated compushtruder.

Examples are known from the patent literature wherein plastic products resembling wood are manufactured but wherein the mechanical properties as obtained according to the method of the invention are not obtained therein.

The known methods, insofar as a relatively high proportion of wood mass is processed into the product, moreover make use without exception of a machine with a strong kneading action, such as for instance the Banbury mixer or the Buss Co-kneader, which is deliberately not used in the new method in respect of the harmful effect of such a kneading machine on the dimensions and properties of the applied wood fibres.

The applications of the products according to the known methods are limited to ornamentation, covering, fence palings etc., wherein the wood part is considered as filler:

EP-A-0 114 409, E.I. Du Pont de Nemours, 1994

U.S. Pat. No. 5,030,662, A. K. Banerjie, 1991

U.S. Pat. No. 4,866,110, Chang Y. Lee, 1989

U.S. Pat. No. 5,082,605, J. G. Brooks et al, 1992

NL-A-77,04265, Lankhorst Touwfabrieken, 1978

WO-A-90/08020, Polywood Patent AB, 1990.

Description of the construction of the compushtruder.

On the compushtruder can be distinguished:
(1) compounder: preferably twin-screw or single-screw with adapted screw geometry,
(2) rotating displacement pump, preferably toothed wheel, plunger or screw,
(3) distribution head
(4) orienting means,
(5) mould head, also calibrating device,
which parts are further described hereinafter.
(1) Compounder The function of the compounder, as for instance from the series Theysohn TSK-N, Leistritz ZSE-GL, is to encapsulate particles, in particular wood fibres, in the liquid thermoplastic. This must take place such that the wood fibre is completely enclosed with polymer, however without the fibres effectively being shortened herein through breaking in the length. The wood fibres may however split longitudinally. This situation is achieved by the polymer melt wetting the fibres. Due to the relatively strong adhesion properties of the melt in relation to the fibres the latter are carried along and dispersed homogeneously further on in the melt phase. Adapting the screw geometry prevents too intensive a kneading action being applied to the mixture, as is usually the case with for instance the Banbury mixer or a standard compounder. A conscious choice has been made for a long compounding path instead of a short sharp one, wherein the wood particles are handled carefully while a homogeneous dispersion nevertheless occurs. The wood particles are preferably introduced under compression and compacted to prevent excess air inclusion which could affect the quality of the end product.

By successively compressing, decompressing and degassing under vacuum the mixtures by means of the chosen screw geometry, air and gases are expelled, both from the mixture and from the pores in the fibres. In the case of a single-screw compounder the mixture is driven in a compressed plug flow, whereafter the thermoplastic part is melted.

The adhesion between wood particles and polymer melt is so great and adheres such that optional further additions can be made to the mixture without breaking the adhesion between polymer and wood particles.

Optional reinforcing fibres on a basis of cellulose, such as flax, hemp or mineral fibres of glass, (mica) plates or the like can be carried along in the above path.

The pressure on the mixture for the purpose of the shaping phase is not provided, as is usual, by the principle of the extruding action of the screw but by a rotating displacement pump interposed for this purpose.

(2) Rotating Displacement Pump

The pressure required to press the mixture through the distribution head (to be described below), the orienting means and the mould head/calibrating device is produced by a displacement pump, preferably a screw pump of a gear pump, for example Maag, Expac type Estrex 56/56 or Witte type ESTHF 92.6 LKK. High pressures can be realized without any significant effect on particle shape and dimensions. Moreover, since large shearing forces are practically absent, the desired pressure increase can be realized without excessive thermal load and degradation of the mixture.

(3) Distribution Head

The distribution head is a necessary "interface" between rotating displacement pump and orienting means. The laminar flow pattern from the rotating displacement pump must be converted to a plug flow.

The particle orienting means must be supplied with a constant flow of mixture which in quantity and speed is distributed equally over the flow surface of the orienting means, this in order to prevent blockage and turbulence as result of speed differences after each phase of the particle orientation. The distribution head thus initiates the required placidity within the flow profile. The plug flow can be optimized:

mechanically by varying the through-flow surface per channel using adjustment bolts which can be accessed from outside and/or thermally by varying the flow resistance per channel using heating elements.

The form of the distribution head depends partly or wholly on the desired product.

(4) Orienting Means

The orienting means consist of a plurality of plates connected in series with slits (in the case of plates) or (cylindrical) holes (in the case of fibres) in the flow direction. The total through-flow surface per plate is mutually equal. The diameter of the holes decreases over the plates connected in series. The diameter and the decrease thereof over the plates depends on the particle dimensions and the desired degree of orientation. When short fibres with a length of 2 mm and an LID ratio of 4 are guided through a hole of 2.5 mm, little or no orientation will occur.

If a long fibre with a length of 4 mm and an L/D ratio of 8 passes through the same hole, then orientation will occur.

The number of plates depends on the degree of uniformity in the fibre length, the L/D ratios thereof and the desired degree of orientation.

The length of the slits or cylindrical holes is preferably at least equal to the maximum linear particle dimension.

Transition plates between the hole plates with different diameters have of course the same through-flow surface as the hole plates.

(5) Mould Head/Calibrating Device

In order to make a two-dimensionally shaped endless product from the "wood mixture" with the oriented particles a Mould head and a calibrating device are necessary. In contrast to the typically used extrusion shaping process, mould head and calibrating device are constructed integrally in the compushtrusion process, since the pushtrudate may not be pulled or have pressure exerted thereon in lengthwise direction.

An essential condition for obtaining technical wood is that after shaping the mixture is cooled under pressure to below the Vicat softening temperature of the binder thermoplastic. This consolidation process is necessary to prevent delamination and matrix failure.

The system pressure is derived from the flow resistance between mixture and mould head/calibration.

In order to prevent delamination and matrix failure in the calibration the first part hereof is covered with a coating which substantially reduces the surface resistance to a value wherein no delamination and matrix failure occurs. The outer part of the product meanwhile cooled to below the Vicat softening temperature in the calibration provides matrix support of that part of the product, the material core, still lying below the Vicat softening temperature.

Process Parameters

It will be apparent that in the compushtrusion process many parameters can be distinguished which all have their influence on the creation, quality and properties of the technical wood.

The process parameters can be sub-divided as follows:

(1) Variable parameters, being adjustable parameters which can be varied on-line.

(2) Adaptable parameters are set once subject to the type of technical wood and the desired product section.

(1) Variable Parameters

The variable parameters can be further sub-divided into two categories:

(1)a. as they also occur in the known compounding/extrusion process:
temperatures, for instance set temperature profile of the screw cylinder, temperature of mould head,
screw rotation speed,
with twin-screw compounder: the filling level by means of dosaging,
pressure, interactive,
degassing, absolute pressure of the vacuum.

(1)b. new compushtrusion parameters:
through-flow surface adjusted by means of adjustment bolts and/or temperature profile of the channels in the distribution-head,
temperature of the particle orienting provision,
temperature of the calibration,
rotating displacement pump temperature,
rotating displacement pump pressure and output.

(2) Adaptable parameters
screw geometry,
manner and position of dosage,
degassing zones and number,
L/D ratio of the compushtruder,
number of orientation plates,
diameters and lengthwise change in the holes in the orientation plates,
flow resistance in the mould head/calibrating device,
position and active length of the resistance-reducing coating in the calibrating device.

Example of the method and the mechanical properties of obtained technical wood.

The method is performed in a compushtruder as described above with a capacity of 200 kg per hour.

The composition of the mixture is as follows:
60% by mass pinewood, length of the fibrous particles 0.6–3 mm,
L/D=4, moisture content 2.2% by mass
40% by mass polypropylene. MFI=15 dg/min, (230/2,16)
no other additions.

The most important process parameters are as follows:
temperature profile in the range 160–195° C.
compounder feed pressure 15 bar
rotating displacement pump pressure 95 bar
vacuum 20 kPa.

Measured mechanical properties of the technical wood:
Six samples were measured wherein the following results were obtained in respect of the length orientation of the wood particles:

| Tensile strength test (ISO 527) | | standard deviation |
|---|---|---|
| Maximum tensile force | 23.5 MPa | 0.4 MPa |
| E-modulus | 5.737 GPa | 0.104 GPa |
| Tensile strength transversely of fibre direction | 12.2 MPa | 0.35 MPa |
| Tensile stress modulus transversely of fibre direction | 2.122 GPa | 0.102 GPa |
| Bending tests (ISO 178): | | |
| Maximum bending load | 32.0 MPa | 0.3 MPa |
| Bending modulus | 3.849 GPa | 0.098 GPa |

Addition of 10% glass or flax fibre with a length of 4 mm and L/D 150 to 400 gives values about 25% higher than shown above.

A product can in principle be manufactured in any suitable manner, starting from pre-compounded material or semi-manufacture, for instance by (isostatic) pressing, injection moulding, extruding, compushtruding.

A specific embodiment has the feature that the product consists substantially of a laminate comprising a plastic-based composite layer according to the above stated specifications; a first skin layer adhered thereto on one side and possessing chosen properties; optionally a second skin layer adhered thereto on the other side and possessing chosen properties; and which layers are mutually adhered by for instance glueing, welding, mirror-welding, with an infrared laser, with hot air or other suitable treatment.

Another embodiment is characterized by at least one additive for obtaining desired properties, which additive is added to the process flow at a suitable position in the compushtruding process during manufacture of the product.

The said chosen properties of the skin layers may relate for instance to the adherability of paint, lacquer and glue.

A variant of this latter embodiment has the feature that the skin layer or at least one of the skin layers is of the type according to the invention and the long particle orientation thereof has a chosen direction relative to this orientation of the first mentioned plastic layer. Specific mechanical properties can hereby be achieved. These can be based for instance on the Stringer effect.

As already noted, the product according to the invention lends itself very well for manufacture by means of a process which can best be described as compushtrusion. In this respect the invention likewise provides a compushtrusion apparatus for manufacturing a product of the above specified type, which apparatus comprises: a compounder operating at low pressure for plasticizing a mixture consisting substantially of plastic and particles with tensile strength, which particles are mixed with the plastic either beforehand or in the compounder, and pressing the plastic mixture to the outside via an outlet;

a rotating displacement pump further transporting the plastic mixture;

a distribution head further guiding the mixture in order to further transport the plastic mixture substantially as a plug flow;

orienting means further guiding the mixture, comprising at least one bundle of substantially parallel channels through which the plastic mixture can flow and which are dimensioned relative to the long particles such that, other than to a dominating extent in the particle principal direction, they are too small to allow passage of the long particles present in the plastic mixture; and a substantially prismatic mould head which connects onto the outlets of the channels and the form of which corresponds with the desired cross sectional form of the product;

such that the principal direction of the particles corresponds with the longitudinal direction of the mould head and the principal direction of the product;

which mould head is so long and has a temperature curve in the longitudinal direction such that at the end of the mouth the product has cooled to below its Vicat softening temperature.

As already discussed, the adhesion of lacquer, paint and glue can be enhanced by mechanical means, for instance due to a certain porosity and protruding fibres.

Another embodiment which achieves the same effect in chemo-physical manner is characterized by an additive with a desired influence on chosen properties of the product and belonging to at least one of the following classes:

influencers of adhesion between particles with tensile strength and matrix polymer (class H), influencers of the properties of the surface of the product, particularly in respect of coatings or adhesives for applying in sandwich structures (class O), influencers of the pyrogenic properties (class P), influencers of the particle durability (class D), blowing means for obtaining a foamed structure (class B), in the case of a sufficiently high temperature increase.

The invention will now be elucidated with reference to the annexed drawings, wherein:

BRIEF DESCRIPTION OF THE VIEWS OF THE DRAWINGS

FIG. 1 shows a highly schematic, partly broken away perspective side view of a compushtrusion apparatus with which a product according to the invention can be manufactured;

FIG. 2 shows a highly schematic side view of an apparatus with which another product according to the invention can be manufactured;

DETAILED DESCRIPTION OF THE PREFERRED EMBODIMENTS

Figure 3:
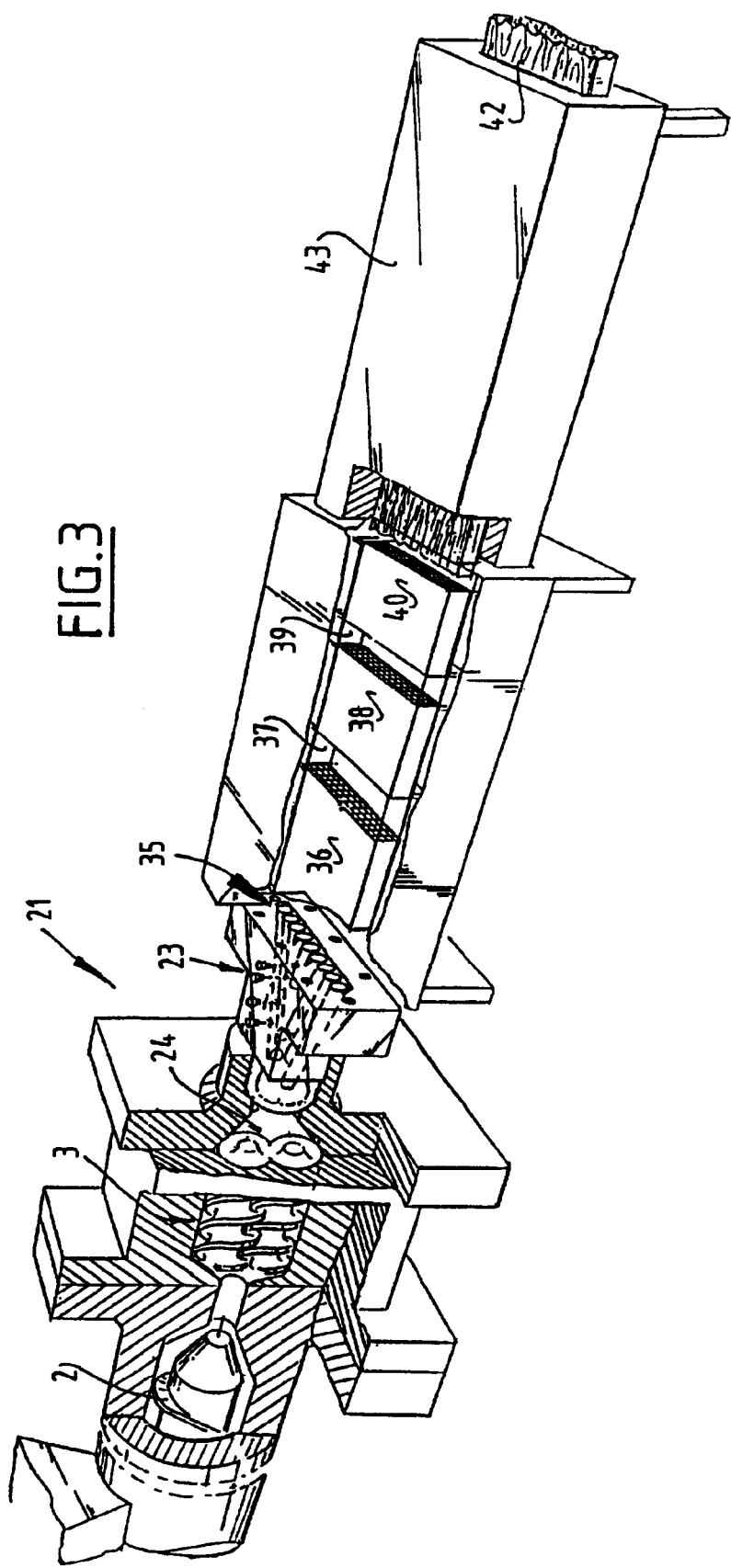
FIG. 3 is a cut away perspective view corresponding with FIG. 1 of a variant.

FIG. 1 shows a compushtruder 1. This comprises a compounder 2, a rotating displacement pump 3, a distribution head 4, a particle orienting member 42 and a mould head/calibrating unit 43. The distribution head 4 and the orienting head 5 comprise continuous channels through which can pass the plasticized plastic, in which fibres with tensile strength are incorporated. The long fibres have a length predominantly in the range of 2–6 mm. In order to give these fibres the desired orientation, that is, the longitudinal direction designated with arrow 6, the continuous channels comprise in the distribution head 4 and the orienting head 5 sub-channels having an effective diameter of for instance in the order of 6–8 mm, taking account of the wish to choose the diameter size of the said channels such that the orientation of the short fibres in not affected. It will be apparent that for other fibre lengths the said passages can be adapted correspondingly. The product 7 consists substantially of the solidified composite mass in which the long fibres extend generally at least roughly in longitudinal direction 6.

FIG. 2 shows an alternative. Two compushtruders 8, 9 deliver products 10, 11 respectively in the direction of the pinch between two rollers 12, 13. At the position of the pinch 14 a plastic-impregnated fibre mat 15, comprising for instance glass or aramide fibres, is introduced between the plate-like products 10, 11 by transport rollers 16, 17. A laminate 18 is thus formed by heating and by the force exerted by rollers 12, 13. The fibres in the fibre mat 15 extend substantially in the longitudinal direction 6. At least one of the products 10, 11 displays a desired porosity in order to ensure properties corresponding with wood.

For greater thicknesses a product can be manufactured from a plurality of laminates placed one on top of another and mutually adhered by a thermal treatment and pressure.

It is further noted in general that binders can also be added to the basic plastic in order to improve the adhesion between fibres, plastic and other additives.

The adhesion to the product according to the invention of paints and lacquers on acryl-water basis can hereby also improve.

The use of colouring agents or pigments in the mass can provide the advantage that a uniform product is obtained.

With reference to FIG. 2 attention is drawn to the fact that by making use of for example co-extrusion or other suitable technique on the product according to the invention an additional coating can be applied to the visual side of the product. Such a coating can have an extra-stable colour, an increased UV-resistance or resistance to dirt and weather influences.

In contrast to the above mentioned prior art the invention provides a product which lends itself for processing and treating as wood. The following considerations are paramount here.

The product according to the invention can have a linear expansion similar to wood and also has a similar strength and stiffness with a comparatively great toughness and excellent cracking strength. The product can display fire characteristics which, by making use of environmentally-friendly provisions, must be at least the equal of the fire characteristics of normal wood and which when it burns may not produce any more smoke and harmful substances than normal wood. At a specific weight of 750–1250 kg/m$^3$, the process and the required raw materials and additives may not exceed the price of normally processed wood.

In terms of appearance and weight the product according to the invention can if desired display a striking similarity with natural wood or traditionally pressed wood such as MDF or wood fibre board.

The product according to the invention can be worked with normal tools and normal wood processing machines. In the usual manner of wood it can be nailed, sawn, screwed, glued, painted and lacquered.

The product according to the invention can possess an excellent resistance to climatological conditions such as moisture, sunlight with ultraviolet component, temperature changes etc.

The products according to the invention are better suitable for recycling after use than natural wood.

The products according to the invention are superior to wood in respect of moisture absorption, rotting, swelling and the like.

Figure 4:
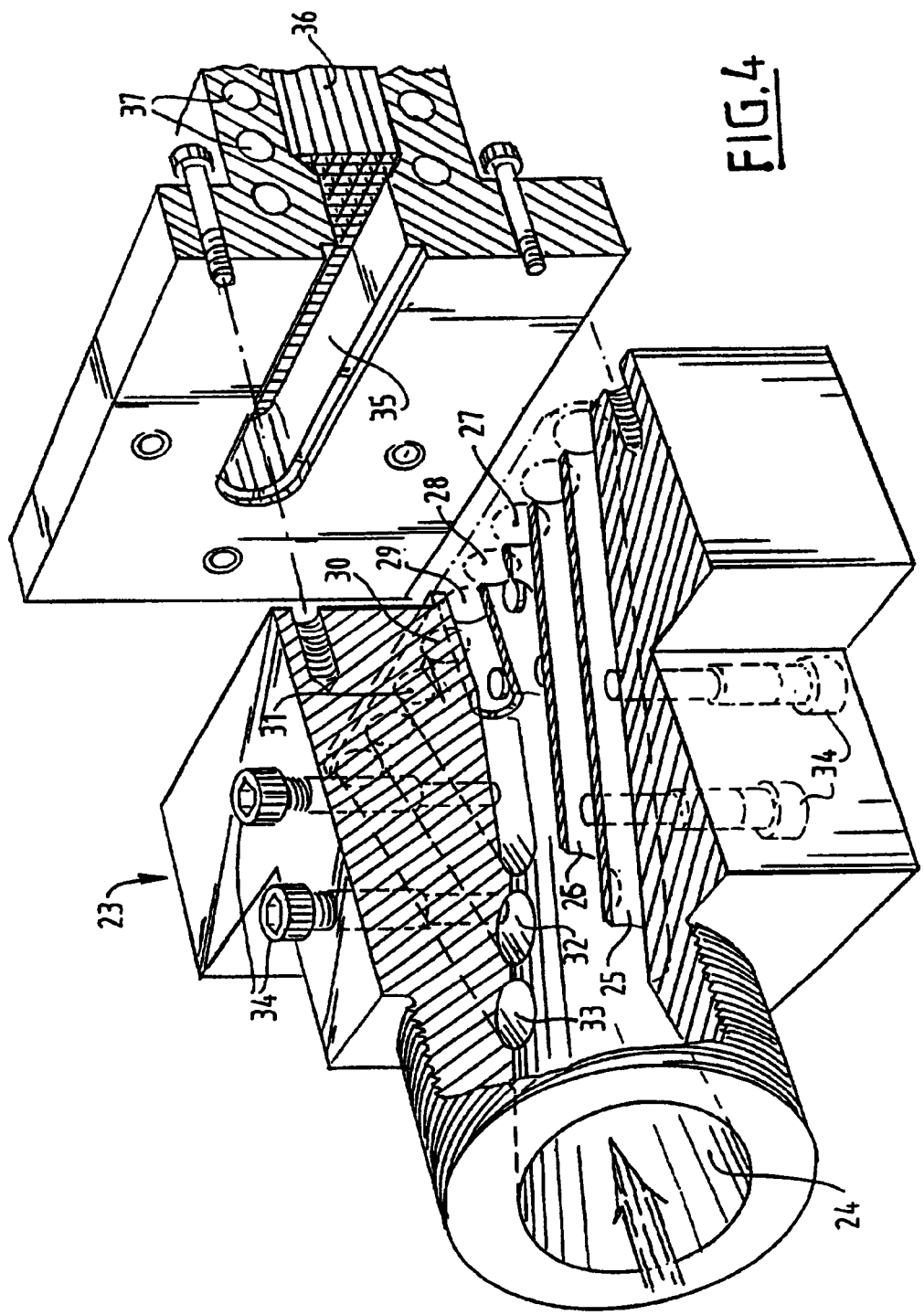
FIG. 4 is a cut away perspective view on enlarged scale of a part of the apparatus according to FIG. 3.

FIG. 3 shows a compushtruder 21 which has a structure differing partially from that drawn in FIG. 1. A distribution head 23 connects onto the rotating displacement pump 3 (see also FIG. 4). This-block has a more or less conically tapering inlet space 24 which debauches into a fan of nine channels 25–33. FIG. 4 in particular shows clearly the internal structure of the distribution head 23. By means of screws controllable from outside, which are all designated 34 for the sake of convenience, the effective passage and therewith the flow resistance of channels 25–33 can be individually adjusted. An excellent homogeneity of the through-flowing mixture can hereby be ensured. Alternatively, the effective through-flow of the channels can be influenced by a selective heating. The through-flow of a channel can in any case be improved by reducing the flow resistance. This can be achieved not only by adjusting the passage but also by changing the temperature, whereby the viscosity of the through-flowing mixture changes, at least in the boundary surface, thereby changing the effective through-flow.

Via a collection space 35 the plastic mixture allowed through is fed to a bundle 36 of channels which is bounded by plates extending one on top of another in transverse direction. By means of channels 37 sufficient heat can be supplied to the through-flowing mixture to keep it in plastic state. A second bundle 38 follows the first bundle 36 via an interspace 37. A third bundle 40 follows via an interspace 39.

Downstream of this latter bundle 40 is situated the mould head 43 of the compushtruder 21. By means of calibrating and cooling means the product is then cooled gradually while a sufficient pressure is maintained, and is carried to the outside in the correct dimensions. Product 42 according to FIG. 3 has an orientation of the long fibres corresponding with the mould longitudinal direction.

The diameters of the mutually adjacent round channels in bundles 36, 38, 40 amount in this embodiment to respectively 14 mm, 8 mm and 6 mm while retaining the same through-flow surface.

It will be apparent from the structure shown in FIG. 4 that the mass flowing through the more inwardly located channels has a smaller flow resistance than the mass flowing through the more outwardly located channels, since they are longer. In this context the more inwardly located channels can have a slightly smaller diameter.

It is noted that in all compushtruders the mixture with the fibres embedded therein is introduced into the mould head by the rotating displacement pump at a relatively high temperature above the Vicat softening temperature, for instance 180° cools during the transport through the mould head and has reached a reduced temperature at the end such that the exiting product has a temperature below the Vicat softening temperature, whereby it is sufficiently cured that it will no longer undergo any substantial change in shape.

What is claimed is:

1. Plastic-based composite product comprising a plastic mass in which particles comprising wood are homogeneously embedded, which particles have tensile strength in a first particle direction, said product having a chosen principal product direction,
    wherein the particles comprise:
    small particles being fibers and having a random orientation and a length of 0.2–2 mm; and
    large particles dominantly orientated such that their first particle direction is in said chosen principal product direction, said large particles being larger than said small particles and having a length in the first particle direction of about 2–6 mm, wherein the product is elongated and the chosen principal product direction is the longitudinal direction of the product.

2. Product as claimed in claim 1, wherein the particles are elongated.

3. Product as claimed in claim 2, wherein the large particles are fibers, and wherein the first particle direction is the longitudinal direction of each fiber.

4. Product as claimed in claim 1, wherein the wood particles consist of a material selected from the group consisting of fir, spruce, birch and poplar.

5. Product as claimed in claim 1, wherein the plastic mass is a thermoplastic polymer.

6. Product as claimed in claim 5, wherein said wood material particles are elongated and have a length in the first particle direction and have a transverse dimension perpendicular to said first particle direction, the ratio between the length in the first particle direction and said transverse dimension being 4 or more, wherein the wood particles are present in the plastic mass in a quantity of 40–80% by mass, and wherein the product complies with the following requirements relating to mechanical properties in
    bending strength in the first particle direction: at least 8 Mpa
    bending modulus in the first particle direction: at least 3 Gpa
    tensile strength in the first particle direction: at least 6 Mpa
    tensile stress modulus in first particle direction: at least 3 Gpa.

7. Product as claimed in claim 6, wherein the ratio lies in the range of 6–80.

8. Product as claimed in claim 6, wherein the wood particles are present in the plastic mass in a quantity of 50–70% by mass.

9. Product as claimed in claim 6, wherein the particles include particles of non-wood material present in the plastic mass in a quanitity of 3–25% by mass, said particles of non-wood material including fibers of natural cellulose polymer.

10. Product as claimed in claim 6, wherein fibers of natural cellulose polymer are also present and are made from a material selected from the group consisting of flax, jute, hemp, sisal, coconut, bamboo and miscanthus.

11. Product as claimed in claim 6, wherein the particles include particles of non-wood material present in the plastic mass in a quantity of 3–25% by mass, said particles of non-wood material including glass fibers with a length of 4–5 mm and a diameter of 0.013 mm and a ratio of length to diameter in the range of 300–400.

12. Product as claimed in claim 5, wherein the polymer is a polyolefin.

13. Product as claimed in claim 12, wherein the polyolefin material is a material selected from the group consisting of polypropylene and polyethylene.

14. Product as claimed in claim 1, wherein the large particles are plate-shaped having a main plane, the first particle direction extending in said main plane.

15. Product as claimed in claim 1, comprising at least one coloring agent or pigment.

16. Product as claimed in claim 1, wherein the product is a plate-shaped layer, a skin layer being adhered to at least one of sides of the plate-shaped layer.

17. Laminated product comprising a plurality of products according to claim 1, wherein the products are plate-shaped and have main planes, and wherein the plate-shaped products are adhered to one another on their main planes.

18. Plastic-based composite product comprising a plastic mass in which particles comprising wood are homogeneously embedded, which particles have tensile strength in a first particle direction, said product having a chosen principal product direction, wherein the particles comprise:

small particles being fibers and having a random orientation and a length of 0.2–2 mm; and large particles dominantly orientated such that their first particle direction is in said chosen principal product direction, said large particles being larger than said small particles and having a length in the first particle direction of about 2–6 mm, wherein the plastic mass is a thermoplastic polymer.

19. Product as claimed in claim 18, wherein said wood material particles are elongated and have a length in the first particle direction and have a transverse dimension perpendicular to said first particle direction, the ratio between the length in the first particle direction and said transverse dimension being 4 or more, wherein the wood particles are present in the plastic mass in a quantity of 40–80% by mass, and wherein the product complies with the following requirements relating to mechanical properties in bending strength in the first particle direction: at least 8 Mpa bending modulus in the first particle direction: at least 3 Gpa tensile strength in the first particle direction: at least 6 Mpa tensile stress modulus in first particle direction: at least 3 GPa tensile strength transversely of first particle direction: at least 0.3 Mpa tensile stress modulus transversely of first particle direction: at least 1 Gpa.

20. Product as claimed in claim 19, wherein the ratio lies in the range of 6–80.

21. Product as claimed in claim 19, wherein the wood particles are present in the plastic mass in a quantity of 50–70% by mass.

22. Product as claimed in claim 18, wherein the polymer is a polyolefin.

23. Product as claimed in claim 22, wherein the polyolefin material is a material selected from the group consisting of polypropylene and polyethylene.

* * * * *